United States Patent
Jacobson

(10) Patent No.: US 8,395,987 B2
(45) Date of Patent: Mar. 12, 2013

(54) INDICATING AVAILABILITY STATUS OF SERVICES PROVIDED BY A MOBILE COMMUNICATION NETWORK

(75) Inventor: Caroline Jacobson, Stocksund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1165 days.

(21) Appl. No.: 10/563,319

(22) PCT Filed: Jun. 30, 2004

(86) PCT No.: PCT/SE2004/001060
§ 371 (c)(1),
(2), (4) Date: Jan. 4, 2006

(87) PCT Pub. No.: WO2005/004526
PCT Pub. Date: Jan. 13, 2005

(65) Prior Publication Data
US 2006/0209675 A1    Sep. 21, 2006

(30) Foreign Application Priority Data
Jul. 4, 2003   (SE) ...................................... 0302004

(51) Int. Cl.
*H04J 1/16* (2006.01)
(52) U.S. Cl. ..................................... 370/216; 455/422.1
(58) Field of Classification Search ............... 455/552.1, 455/422.1; 370/216, 310
See application file for complete search history.

(56) References Cited

U.S. PATENT DOCUMENTS

| 7,123,910 B2 * | 10/2006 | Lucidarme et al. ........... 455/434 |
| 2003/0114158 A1 | 6/2003 | Soderbacka et al. |
| 2007/0264994 A1 * | 11/2007 | Schwarz et al. ........... 455/422.1 |

FOREIGN PATENT DOCUMENTS

| WO | 03/044616 | 5/2003 |
| WO | 03/063458 | 7/2003 |

OTHER PUBLICATIONS

International Search Report for PCT/SE2004/001060 dated Oct. 7, 2004.
3GPP TS 25.331 V3.15.0, $3^{rd}$ Generation Partnership Project; Technical Specification Group Radio Access Network; Radio Resource Control (RRC) protocol specification (Release 1999), Jun. 2003 (853 pages).

* cited by examiner

*Primary Examiner* — Phuoc Doan
(74) *Attorney, Agent, or Firm* — Nixon & Vanderhye P.C.

(57) ABSTRACT

The availability of services to user equipments is increased when the UTRAN temporarily does not work properly, e.g. due to network faults or congestions. For this purpose a first communications network UTRAN (10) provides appropriate status information with regard to the availability of at least a certain range of its services and is capable to re-direct a user equipment (14) to a backup network (11) when the needed service is not available. The network (10) also provides the possibility to continue the usage of services in UTRAN that are still available even if the user equipment (14) intends to apply for a temporarily unavailable service, which the UTRAN (10) can instead arrange to be provided by the backup network (11). This is done by an information element denoting a re-direction retry indication in the RRC Connection Release message including at least the same parameters as a RRC Connection Setup Reject message.

17 Claims, 2 Drawing Sheets

INDICATING AVAILABILITY STATUS OF SERVICES PROVIDED BY A MOBILE COMMUNICATION NETWORK

This application is the U.S. national phase of international application PCT/SE2004/001060 filed 30 Jun. 2004 which designated the U.S. and claims priority to SE 0302004.7 filed 4 Jul. 2003, the entire content of each of which are hereby incorporated by reference.

BACKGROUND

The present invention relates to methods and arrangements in a mobile $3^{rd}$ generation communication system and user equipments intended for usage in such systems. It relates in particular to situations when certain services, e.g. related to emergency calls, in the UTRAN are not available while the user equipment could perform this service also over a backup network, e.g. a GSM-network, which it can access.

The technology disclosed herein relates to the radio network part (UTRAN) of a $3^{rd}$ generation communication system, e.g. a WCDMA-system, to which the following will refer to as an example, and addresses in particular problems that may arise when certain services, which the network is supposed to offer, are unavailable, e.g. due to faults in one of the units or links of said communication system or due to temporary congestions in said communication system.

Present $3^{rd}$ generation communication systems, as standardised by the $3^{rd}$ Generation Partnership Project (3GPP), do not fully support to use another communication system, e.g. a GSM-system, as a backup system for services that are temporarily unavailable. Vice versa, there is presently no full support to use the UTRAN as a backup system, e.g. of a GSM-system, which is only used for certain services. Instead, a user equipment must stay in the communication system, which it presently is associated to, although a required service is presently not available or the user equipment is forced to move entirely to the backup communication system, although certain services that are needed by the user equipment would still be available in the disturbed system.

SUMMARY

The technology disclosed herein increases the availability of services to user equipments even when the UTRAN temporarily does not work properly with regard to a certain service. The services relate to such services that can be performed typically in the one network, e.g. the UTRAN, but also in a backup communication network, e.g. the GSM-system. One important example of such services relates, e.g., to emergency calls. However, the technology disclosed herein is notwithstanding also applicable for other kinds of services.

The technology disclosed herein also achieves a prioritisation with respect to certain services between a first and a second communication network, i.e. certain services are preferably performed in one of the communication networks although the user equipment remains associated with one network.

The technology disclosed herein comprises a communication system and a user equipment that are capable of providing the following features:

1) An appropriate network unit within the UTRAN, e.g. the Radio Network Controller serving said user equipment, comprises means to inform user equipments that are served by said system about UTRAN services that are not available and, optionally, additional information that may indicate, e.g., a reason for said unavailability or an estimated time interval within which a service is unavailable. Possible reasons for such service unavailability can be, e.g., a network fault or a traffic congestion. Alternatively, the network can instead indicate the still available alternatives in case of a network fault. More generally, the UTRAN comprises an appropriate status information with regard to the availability of at least a certain range of its services.

2) The network is capable to re-direct a user equipment to a backup network, e.g. a GSM-network, in cases where a needed service in the UTRAN is not available. It is thus possible for the user equipment to use available services in UTRAN while the network or user equipment can arrange that temporarily unavailable services are instead provided by the backup network.

3) A user equipment comprises means to indicate to the network the priority of new requested services. The priority information can be used by the network, e.g., when the user equipment requests a temporarily unavailable service while already using another network service. Then, the re-direction is only performed if the new service has a higher priority.

It is a first advantage of the technology disclosed herein that the service availability is increased although, e.g., a fault or temporary congestion limits or prevents a user equipment from using this service in the network, which it is associated to.

It is thus a further advantage of the technology disclosed herein that the overall availability of services can be increased due to the possibility to obtain certain services from the one or other network, which can be used advantageously in congestion situations and, thus, can serve for load control purposes.

It is still another advantage of the technology disclosed herein that the time within which a user equipment is not pageable after a RRC Connection Release message and data interrupt times are significantly reduced.

Other objects, advantages and novel features of the technology disclosed herein will become apparent from the following detailed description of the invention when considered in conjunction with the accompanying drawings and claims.

DETAILED DESCRIPTION

Figure 1:
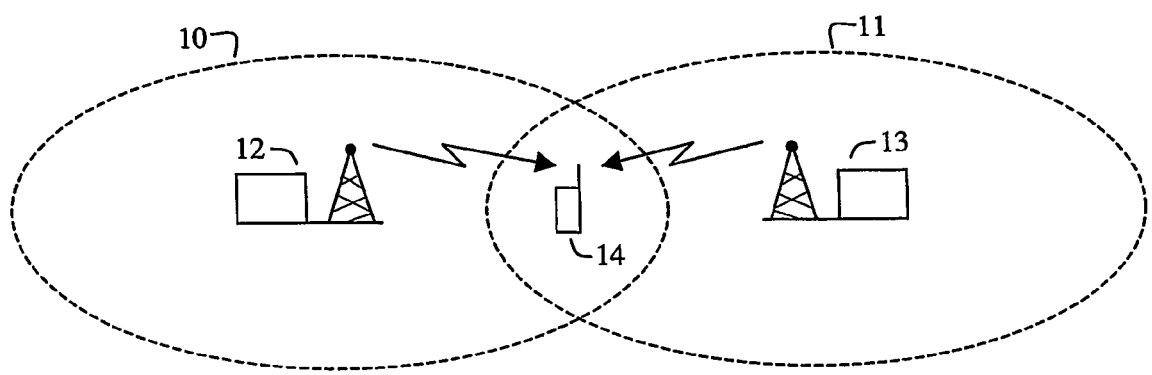
FIG. 1 shows a first and second communication network within which the technology disclosed herein can be applied.

The technology disclosed herein concerns a communication system and a user equipment that are capable of providing the following features:

1) An appropriate network unit 12 within the UTRAN 10, e.g. the Radio Network Controller serving said user equipment, comprises means to inform user equipments 14 that are served by said system 10 about UTRAN services that are not available and, optionally, additional information that may indicate, e.g., a reason for said unavailability or an estimated time interval within which a service is unavailable. Possible reasons for such service unavailability can be, e.g., a network fault or a traffic congestion. Alternatively, the network 10 can instead indicate the still available alternatives in case of a network fault. More generally, the UTRAN 10 comprises an appropriate status information with regard to the availability of at least a certain range of its services.

2) The network 10 is capable to re-direct a user equipment 14 to a backup network 11, e.g. a GSM-network, in cases where a needed service in the UTRAN 10 is not available. It is thus possible for the user equipment to use available services in UTRAN while the network or user equipment can arrange that temporarily unavailable services are instead provided by the backup network 11.

3) A user equipment 14 comprises means to indicate to the network the priority of new requested services. The priority information can be used by the network, e.g., when the user equipment requests a temporarily unavailable service while already using another network service. Then, the re-direction is only performed if the new service has a higher priority.

According to a first aspect of the technology disclosed herein the communication system 10 comprises means to inform user equipments 14 that are served by said system about the availability of UTRAN services. This network means is capable to inform the user equipment 14 about services, or at least a certain range of services, that are not available or inform it about available alternatives for the use of a certain requested service. It is then up to the user equipment, or the user, to select the appropriate network when requesting for a new service. This can be realised by means of including such availability information in an appropriate information message that is sent within certain time periods, e.g. the system information that is updated periodically and sent to the user equipment 14. The information element transmitted in such a message should be such that all user equipments are requested to read this information when the system information is updated. This could be achieved by applying mechanisms that are currently specified in the Technical Specification document 3GPP TS25.331 "RRC Protocol Specifications" where a system information block is repeatedly sent on the BCCH with a certain periodicity. For instance, a system information block type 1, which currently contains core network related information, can also include indications about service availability. When the system information carrying the indications are updated a Paging type 1 message is sent to all user equipments in the cell with an information about the updated BCCH, which is also specified in said document 3GPP TS25.331. The user equipment 14 comprises the necessary means to perform a switch to the backup network 11 immediately if a service that is requested by the user equipment 14 is indicated to be unavailable. This method implies the advantage that the system information also covers all idle user equipments and user equipments on common channels. Alternatively, it would be possible to include availability information in a dedicated message, e.g. in the UTRAN mobility information, and send this information to the user equipments on dedicated channels whenever the information changes.

In a conceivable example embodiment, the user equipment comprises means to inform the user about the unavailable service, either immediately or as soon as the user takes any actions to request an unavailable service. By that the user is also able to choose the appropriate priority level for a new requested service.

The following describes an example of the above mentioned functionality in said network 10 and said user equipment 14: When assuming that the Iu-link towards a circuit-switched core network is interrupted, while the corresponding Iu-link towards the packet-switched core network works as usual, a user equipment 14 that is about to make, e.g., an emergency call is informed and can realise that the circuit-switched services are not available and instead set up a call over the backup network 11. Then, the same user equipment 14 when downloading packet data can continue to use the packet-switched core network part as usual on the original network or transfer also the packet-switched core network part to the backup network 11.

According to a second aspect of the technology disclosed herein the network 10 is capable to re-direct a user equipment 14 to a backup network 11 in cases where a needed service in the UTRAN 10 is not available. The following describes thus an embodiment where the network arranges said re-direction autonomously with consideration of the assigned priority for said service where the user equipment is not involved in the decision for re-directing. There could be several reasons that services are not available: Link interruption, e.g. an Iu-link break, various congestion situations in the communication system, or resource shortages, e.g. for a call setup. This is true both when the user equipment 14 already applies a certain service that suddenly becomes unavailable or when the user equipment 14 requests for a new service. The user equipment can only apply services in one network at a time whereby the communication network 10 comprises the necessary means that enable the user equipment 14 to use those services that are still available in its present communication network 10 and re-direct the user equipment 14 to a backup network 11 if a requested service is not available but offered in said backup network 11.

Figure 2:
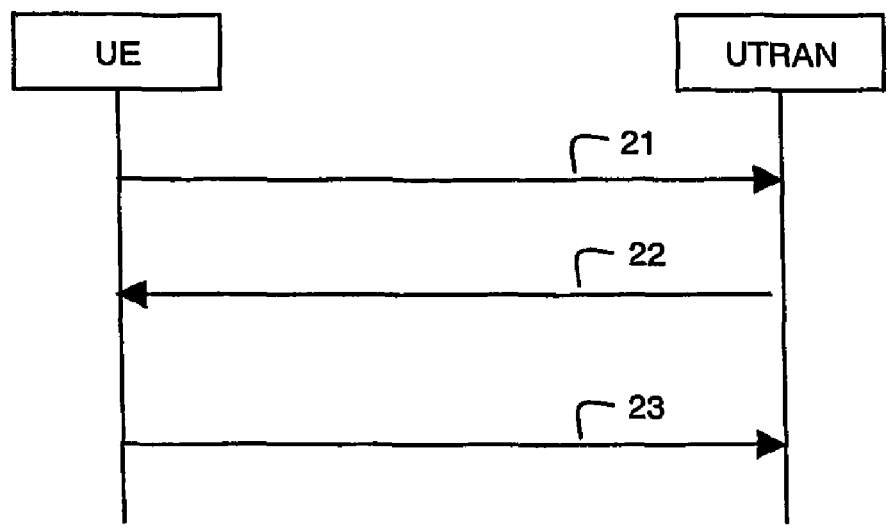
FIG. 2 illustrates an RRC Connection Establishment procedure in UTRAN.
Figure 3:
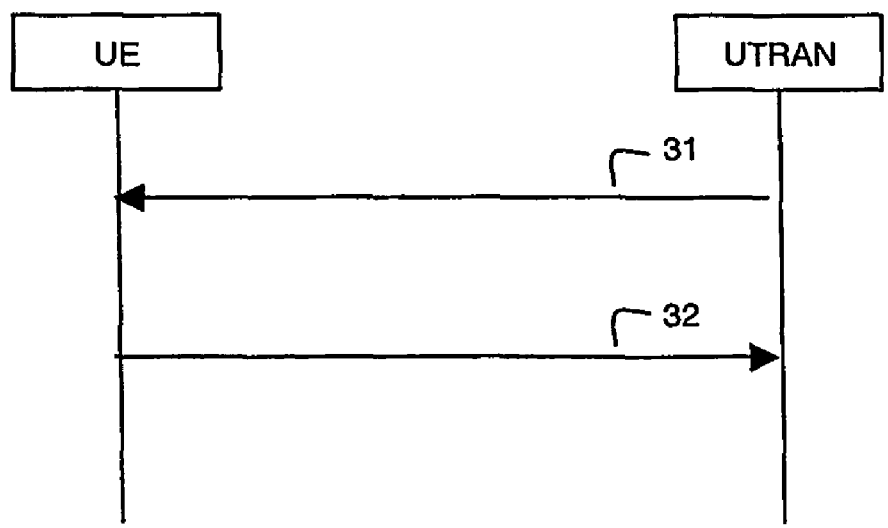
FIG. 3 illustrates the RRC Connection Release procedure in UTRAN.

FIG. 2 illustrates an RRC Connection Establishment procedure in UTRAN, with its messages 21, 22, and 23. FIG. 3 illustrates the RRC Connection Release procedure in UTRAN, with its messages 31 and 32.

In order to always be able to re-direct a user equipment 14 from UTRAN 10 to, e.g., a GSM-network 11, an information element (IE) denoting a re-direction retry indication must be included in the RRC Connection Setup Reject message, as provided for in the Technical Specification document 3GPP TS25.331, issued by the 3GPP, but at least the same parameters must also be included in the RRC Connection Release message. It is essential that this re-direction retry indication is included in said RRC Connection Release message as it is otherwise not possible to re-direct the user equipment 14, e.g., to said GSM-network 11 until said user equipment 14 makes a new access from its idle state.

This becomes apparent from the following example: If the user equipment 14 already has a connection towards a core network domain, a new request will be made with an already established RRC Connection instead of starting from the idle mode. When the original attempt fails, the user equipment 14 still has the RRC-Connection, it will make a new attempt, which also fails, i.e. the user equipment 14 is locked in UTRAN 10 where the requested service is not available. Moreover, if the current connection is, e.g., towards the packet-switched core network and UTRAN 10 releases said user equipment 14 at, e.g., an incoming circuit-switched call (without a re-directed retry) it is very likely that the application in the user equipment 14 will connect again to the packet-switched Radio Access Bearer in the UTRAN before the user equipment has had the possibility to make a new attempt from its Idle mode towards the circuit-switched core network potentially through any existing backup network.

The following describes several examples of re-directions of user equipments 14 to a backup network 11:

1) A user equipment 14 has an ongoing emergency call when a Iu-link break towards the circuit-switched core network occurs. In this case, the call is to be released and re-directed to the backup network 11, e.g. the GSM-network. The UTRAN 10 releases the RRC connection by sending a RRC Connection Release message, as specified above, to the user equipment 14. The RRC Connection Release message includes the re-direct indication to, e.g., the GSM-network 11 so that the user equipment 14 does not retry to connect through UTRAN 10 again where the last connection failed.

2) A user equipment 14 having an ongoing communication over a packet-switched Radio Access Bearer when there is a Iu-link break towards the circuit-switched core network intends to apply a temporary unavailable service, e.g. to set up an emergency call. In this case, the user equipment 14 shall be released and re-directed to the backup network 11, e.g. the GSM-network. Also for this case, the UTRAN 10 releases the RRC connection with a RRC Connection Release message including an indication that the user equipment shall try, e.g., the GSM-network instead. Without this indication a normal RRC Connection release would lead to that the user equipment 14 appears to remain connected to the UTRAN 10 and will try to establish, e.g., currently unavailable service once more in this network. This is true especially since the ongoing packet-switched radio access bearer will try to re-establish the connection directly after the RRC connection release to the UTRAN, where the packet-switched services are available.

3) A user equipment 14 that wants to establish a packet Radio Access Bearer but fails due to a congestion shall have a possibility to be re-directed to a backup network 11, e.g. the GSM-network. For this purpose an appropriate information element (IE) denoting the re-direction retry indication is included in the RRC Connection Release message, said information element including at least the same parameters as specified in the RRC Setup Reject message in order to re-direct the user equipment 14 to said backup network 11. If the packet-switched Radio Access Bearers are not available in the one network, the circuit-switched Radio Access Bearers can still be used in that network; however, if a user equipment wants to set up a packet connection it could be re-directed to the backup network that would provide the packet-switched Radio Access Bearers, e.g. in this case a GPRS-based network.

The technology disclosed herein also allows shortening times within which a user equipment 14 is not pageable after a RRC Connection Release message and shortening of data interrupt times. This becomes apparent when assuming, e.g., that the UTRAN 10 releases a packet-switched connection, e.g. due to a congestion. Then, the data transfer interrupt time might be less if the user equipment 14 is directed to the backup network 11 after a RRC Connection Release message compared to the time during which the user equipment 14 could not transmit any data at all until the congestion in the original network 10 has been resolved. When assuming on the other hand that, e.g., the core network, or connections to it, do not work properly it would not be possible to page user equipments 14. In this case the time during which the user equipment 14 is not pageable can be significantly reduced by re-directing said user equipment 14 to the backup network 11 after a RRC Connection Release instead of waiting until the original network 10 works properly again.

When seen from the perspective of the user equipment, the technology disclosed herein enables the user equipment 14 to inform the UTRAN 10 about the priority of requested services. In order for the UTRAN 10 to make the right decisions regarding whether a user equipment 14 should be re-directed to a backup network 11 or not it is important that the user has a possibility to inform the UTRAN 10 about the priority of a requested service and if current services should be released to make sure that the new attempt will work. In order to cover service requests both for the idle user equipments and user equipments that already are connected, the indications for "priority" and "allow to release other services" are both included in the RRC Connection Request, the Initial Direct Transfer, the UL Direct Transfer, and the Cell Update.

This can be explained by help of an example: Assuming a user equipment having an ongoing Radio Access Bearer and requesting a new Radio Access Bearer. The reason why this request fails could be, e.g., a congestion in the transport network or that a service-server is not available. If the user can inform the UTRAN about the priority level of the requested Radio Access Bearer, e.g. a high priority, and that a release of other services is allowed, the UTRAN may release the user equipment using the RRC Connection Release with re-directed retry in order to be able to use the new requested service in a backup network, e.g. GSM or GPRS.

The invention claimed is:

1. A first cellular mobile communication network providing communication services to one or more user equipments, the network comprising:
    a network unit configured to control a user equipment, the network unit providing means for including an information element within an information message to said user equipments to indicate the availability status of at least a range of services that are provided by said first communication network,
    wherein said network unit is configured to transmit said information message including the information element to the user equipment.

2. The network according to claim 1, wherein said network unit comprises means for re-directing the user equipment to a second communication network, which is accessible for the user equipment, if said user equipment is using or intends to use a service that is temporarily not available in said first communication network.

3. The network according to claim 2, wherein said means for re-directing the user equipment compose a re-direction retry information element in the RRC Connection Release message including at least the same information as a RRC Connection Setup Reject message.

4. The network according to claim 2, wherein said means for re-directing are equipped to receive information regarding a priority of a requested service by the user equipment.

5. The network according to claim 4, wherein said means for re-directing are equipped to not re-direct if the requested service has an assigned lower priority than an already ongoing service of said user equipment on said first communication network.

6. The network according to claim 1, wherein said means are equipped to be operable on detecting a service unavailability due to a network fault.

7. The network according to claim 1, wherein said means are equipped to be operable on detecting a service unavailability due to a temporary congestion situation in the first communication network.

8. A method in a first cellular mobile communication network when releasing a connection of a user equipment to a second cellular mobile communication network, the method comprising:
    determining that a service utilized by the connection is at least temporarily unavailable at the first cellular mobile communication network; and in response thereto
    including in a RRC Connection Release message an information element comprising a re-direction retry message to redirect the user equipment to the second cellular mobile communication network;
    transmitting the RRC Connection Release message comprising the re-direction retry message to the user equipment, and thereafter
    releasing said connection.

9. The method of claim 8, further comprising determining that the service utilized by the connection is at least temporarily unavailable at the first cellular mobile communication network by reason of link interruption; congestion; or resource shortage.

10. A user equipment in a first cellular mobile communication network, the user equipment comprising:
   means for retrieving information, from an information element within an information message received from the first cellular mobile communication network, about the availability status of at least a range of services that are provided by said first communication network;
   means for indicating to said first communication network a priority of a requested service;
   means for accessing services that are available in the first communication network by using the facilities of said first communication network; and
   means for accessing network services, which have been indicated to be at least temporarily riot available in the first communication network, by using the facilities of a second communication network.

11. The user equipment according to claim 10 comprising means for indicating its service availability status to the user of said user equipment.

12. A method of operating a wireless terminal comprising:
   the wireless terminal requesting or receiving a service from a first communications network;
   the wireless terminal receiving, in certain time periods from the first communications network, updated availability information regarding the service from the first communications network;
   the wireless terminal determining that the service is at least temporarily unavailable at the first cellular mobile communication network; and
   the wireless terminal using the availability information to perform a switch to request or receive the service from a second communications network rather than from the first communication network when the availability information from the first communications network indicates that the service is not available from the first communications network.

13. The method of claim 12, further comprising periodically receiving the service availability information in system information broadcast to plural wireless terminals by the first communications network.

14. The method of claim 12, further comprising periodically receiving the service availability information in a dedicated message sent to the wireless terminal.

15. The method of claim 12, further comprising the wireless terminal indicating to the second communications network a priority level for the service.

16. The method of claim 12, further comprising obtaining from the updated availability information a reason for service unavailability.

17. The method of claim 12, further comprising obtaining from the updated availability information an estimated time interval for service unavailability.

* * * * *

UNITED STATES PATENT AND TRADEMARK OFFICE
CERTIFICATE OF CORRECTION

| | |
|---|---|
| PATENT NO. | : 8,395,987 B2 |
| APPLICATION NO. | : 10/563319 |
| DATED | : March 12, 2013 |
| INVENTOR(S) | : Jacobson |

Page 1 of 1

It is certified that error appears in the above-identified patent and that said Letters Patent is hereby corrected as shown below:

In the Claims:

In Column 7, Line 19, in Claim 10, delete "riot" and insert -- not --, therefor.

Signed and Sealed this
Ninth Day of July, 2013

Teresa Stanek Rea
*Acting Director of the United States Patent and Trademark Office*